(No Model.)

W. J. NEESE.
TETHER.

No. 403,062. Patented May 7, 1889.

Witnesses:

Inventor:
W. J. Neese.

By Smith & Sheehy
Attorneys

UNITED STATES PATENT OFFICE.

WILLIAM J. NEESE, OF SENECA, SOUTH CAROLINA.

TETHER.

SPECIFICATION forming part of Letters Patent No. 403,062, dated May 7, 1889.

Application filed August 10, 1888. Serial No. 282,409. (No model.)

*To all whom it may concern:*

Be it known that I, WILLIAM J. NEESE, a citizen of the United States, residing at Seneca, in the county of Oconee and State of South Carolina, have invented certain new and useful Improvements in Tethers; and I do declare the following to be a full, clear, and exact description of the invention, such as will enable others skilled in the art to which it appertains to make and use the same.

This invention has relation to cattle-grazing devices, and the improvements will be fully understood from the following description and claims, when taken in connection with the accompanying drawings, in which—

Figure 1:
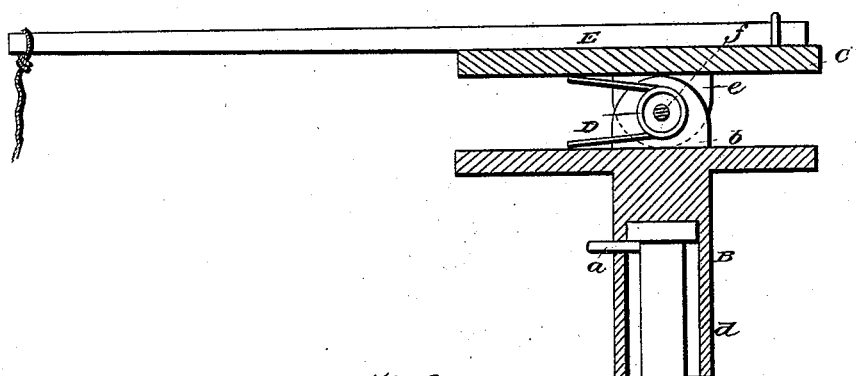
Figure 2:
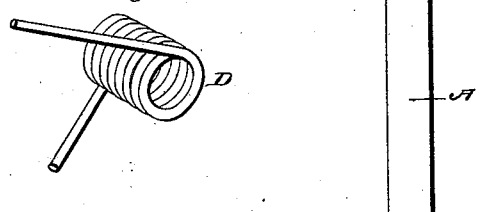
Figure 3:

Figure 1 is a side view of my improved cattle-grazer, showing the upper parts in section. Fig. 2 is a sectional view of the spring removed, and Fig. 3 is a view of the pintle removed.

Referring by letter to the said drawings, A indicates a stake or standard on which the various parts of my device are supported. This stake may be of the form usually employed, having its lower end reduced or pointed, so that it may be easily driven into the ground and its upper end headed, as shown, to form a stop for a set screw or pin, $a$, whereby the parts connecting the hitch-beam may be allowed to rotate and prevent it from leaving the stake.

B indicates a cap, which has its horizontal portion of broad contour, as shown, and formed thereon, at diametrically-opposite points, are small standards $b$, perforated to receive a hinged pintle, as will be presently explained. This cap B has its depending branch $d$ provided with a vertical socket or aperture to receive the upper enlarged or headed end of the stake.

C indicates a cap-plate, which is sufficiently broad to fully cover the socket-cap and the intermediate hinge-connection and spring, which will be presently described. This cap-plate C is provided on its under side with depending lug-journals $e$, which are designed to co-operate with the lugs $b$ on the cap-section B to receive the pintle $f$ in forming a hinge-connection between the two. It will thus be seen that the whole device is swiveled upon the top of the stake or standard, and that the hitch-beam, which will be presently referred to, is connected by a hinge with the said stake or socket cap thereon.

D indicates a spring composed of a spiral wire having its opposite ends free, so as to have one press against the under side of the plate C and the other against the upper side of the cap-plate. It will be observed that the extending branches of this spring are in advance of the hinge-pintle or in the direction toward the free end of the hitch-beam, the object of which is normally to keep the attaching end in an elevated position, yet allowing it to be drawn down freely by the animal while grazing. I attach importance to the employment of this cap-plate C, and to the fact that it forms a shelter for the hinge-joint and the spring arranged therein, keeping it free from exposure from rain, snow, sun, and the like.

E indicates the hitch-beam, one end of which is firmly attached to the cap-plate C, the opposite end being adapted to receive a tie-rope, as shown.

While I have shown and described the spring at the hinge as being of wire in a spiral form, yet it is obvious that a flat spring may be employed at this point to keep the outer end of the hitch-beam normally raised.

It is also obvious that instead of forming the cap-plate B with a socket the stake-post may be hollow and the stem of the said plate allowed to enter the upper end of the said stake, in which construction the hitch-beam, together with the cap-plate, would be allowed to rotate with respect to the stake.

Having described my invention, what I claim is—

1. The combination, with a stake or post, of a hitching-beam, a rotatable cap on the said stake, a hinge connecting the beam with the plate, a spring surrounding the hinge-pintle, so as normally to keep the free end of the hitch-beam elevated, and a cap-plate covering the hinge and spring, substantially as specified.

2. In a cattle-grazer, the combination, with a stake, of a plate adapted to rotate thereon, a plate hinged to this rotatable plate, a spring interposed between the two plates, and a hitch-beam secured to the upper plate, substantially as specified.

In testimony whereof I affix my signature in presence of two witnesses.

WILLIAM J. NEESE.

Witnesses:
J. J. McCARTY,
J. W. STRIBLING.